Patented June 15, 1943

2,322,083

UNITED STATES PATENT OFFICE 2,322,083

EXTRACTION PROCESS

Franciscus Johannes Fredericus van der Plas, Amsterdam, Netherlands, assignor to Shell Development Company, San Francisco, Calif., a corporation of Delaware No Drawing. Application December 9, 1939, Serial No. 308,426. In the Netherlands December 12, 1938

14 Claims. (Cl. 196—13)

This invention relates to a process for the manufacture of refined products from hydrocarbon mixtures by solvent extraction. It is particularly concerned with an extraction process in which the selective solvent consists of antimony trichloride or contains antimony trichloride in a solvent capacity.

The extraction of hydrocarbon oils with selective solvents to separate the oils into portions of different compositions is already known. In such processes the oil to be extracted is commingled with a selective solvent which is, under the conditions of the process, partially immiscible with the oil, causing the formation of a liquid phase containing all or a major portion of the selective solvent together with dissolved constituents, usually designated as the extract phase, and a liquid phase containing the constituents which are not dissolved in the solvent, often together with some of the solvent, usually designated as the raffinate phase. These phases are then separated by convenient physical means, such as settling, centrifuging, etc., and the hydrocarbons contained therein are freed from the selective solvent by distillation, cooling, washing-out, chemical treatment or the like.

In such a process the various constituents of the hydrocarbon oil distribute themselves between the raffinate phase and the extract phase in accordance with definite distribution constants. To attain a separation of the oil into portions having different compositions, it is necessary that the distribution constants for the constituents which it is desired to separate are different. The ratio of the distribution constants should differ from 1 and the ratio between the larger and the smaller of these constants should be as large as possible. The larger this ratio, the more selective the solvent under the conditions employed. Since the constants for all constituents of hydrocarbon mixtures as a rule are finite, both the raffinate phase and the extract phase contain a certain amount of each of the constituents present in the initial oil, so that only a partial separation can be effected in a single stage.

When a greater degree of separation than is possible in one stage is desired, it is necessary to employ several extraction stages in counter-current. The number of stages required to effect a required degree of separation becomes less as the selectivity of the selective solvent under the conditions of the experiment is greater.

The selectivity of a solvent decreases with increasing concentration of the dissolved component(s). The decrease of selectivity fixes the maximum limit for the concentration of the components to be dissolved and consequently the minimum amount of selective solvent, if a given sharpness of separation is required. Said minimum is very low in the case of the solvent used according to my invention, which is a striking advantage of the solvent in question.

Various substances are already known for the extraction of mineral oils to extract selectively the constituents which are least paraffinic, i. e. the aromatic and/or the naphthenic constituents, producing a raffinate which is more paraffinic and an extract which is less paraffinic than the initial oil. Some of these known solvents are liquid $SO_2$, furfural, cresol and nitrobenzene. The selectivity of these solvents is, however, not as great as is desired and often drops quickly as the amount of dissolved salts increases, so that a large number of stages and a large quantity of the solvent, often amounting to several times the quantity of the oil, are required. Moreover, many of these solvents, while suitable for a special type of hydrocarbon mixture, are relatively inefficient when applied to other mixtures. Thus, some solvents are suitable only for distillate oils and not well suited for the extraction of residual petroleum fractions, while other solvents are suitable only for the heavier fractions.

In accordance with the present invention it was found that selective solvents containing antimony trichloride in a solvent capacity (i. e. including solvents which consist substantially of pure antimony trichloride as well as those which contain antimony trichloride in admixture with the impurities present in the commercial product or with other solvents which may themselves be selective or non-selective) are particularly suitable for the extraction of hydrocarbon mixtures. They possess the advantage that they may be applied to a great variety of hydrocarbon mixtures, including distillates as well as residual fractions, and cracked as well as uncracked fractions. Thus, the solvents according to this invention may be applied, inter alia, to gasolines, kerosenes, Diesel fuels and distillate and residual lubricating oils. As a rule they effect separations of the type effected by the solvents enumerated above, i. e. they preferentially extract the less saturated hydrocarbons, producing a raffinate enriched in the more saturated hydrocarbons. In the usual mode of application they extract the aromatic and/or naphthenic hydrocarbons. In treating highly cracked fractions it is desirable previously to remove the highly unsaturated hydrocarbons, such as di-olefines, e. g. with a dilute sulphuric acid.

A further advantage of these solvents is that they may be applied to fractions containing asphalt, asphaltic resins and similar materials. Thus, it may not be necessary to deasphaltize asphaltic oils prior to extractions, it having been found that raffinates having a low Conradson carbon residue and an improved colour can be readily produced from such oils by extraction. The process may, however, also be applied to oils which have been deasphaltized, or to oils which are naturally free from asphaltic bodies. Moreover, in view of the conveniently high temperatures employed, the process may be applied to oils either preceding or following dewaxing.

If the known selective solvents are arranged in a series according to their decreasing selectivity for aromatics, liquid $SO_2$ will be first, whereas quinoline will be last. In a similar series arranged in order of decreasing selectivity for colouring matter, the order is reversed. It is a surprising fact that $SbCl_3$ has not only a higher selectivity for aromatics than liquid $SO_2$ but also a higher selectivity for colouring matter than quinoline.

It is, moreover, possible to separate off various types of unsaturated compounds, such as olefines and diolefines, from the more saturated compounds, such as paraffins, cyclic paraffins and cyclic compounds, containing paraffinic side chains, the olefines being selectively extracted, either alone or together with aromatic and/or naphthenic hydrocarbons.

The process may also be applied to the separation of various synthetic hydrocarbon mixtures, e. g. to hydrocarbon mixtures obtained by hydrogenation or polymerization or by some other synthetic method, e. g. the Fischer synthesis. It may also be used for the regeneration of used lubricating oil, the colouring matter and oxidized and deteriorated constituents being preferentially extracted. Hydrocarbon mixtures obtained in various other industries, e. g. those of the coal and lignite industries, may also be treated. Further it may be applied to the separation of essential oils into their components or into groups of components, e. g. to the removal of terpenes or sesquiterpenes from the oxygen-containing compounds, such as alcohols or aldehydes, present in these oils, the oxygen compounds being dissolved in the $SbCl_3$ phase.

It is possible to separate various types of sulphur compounds, e. g. mercaptans, from light hydrocarbon oils, such as gasoline or kerosene and their fractions, the sulphur compounds being dissolved in the $SbCl_3$ phase.

Apart from its wide scope of applicability, the process is advantageous in that the selective solvents possess an unusually high degree of selectivity, which remains high in the presence of an appreciable quantity of the components to be dissolved. As a consequence, it was found that an appreciably smaller quantity of solvent and fewer stages are required to effect a given separation than in the case of the solvents enumerated above. For example, from 25% to 125% by volume of the solvent, based on the mixture being extracted, are usually sufficient, and a single stage or only a few stages, up to about six, usually suffice, although the invention is not restricted to the use of such solvent-to-oil ratios, or to the use of any particular number of stages. Thus, in special cases where only a light extraction is needed, less than 20% may suffice, whilst in the case of an intensive extraction a large number of stages and 200% or more of solvent can be employed.

It should be noted that antimony trichloride is, in the instant process, employed as a selective solvent, and not as a chemical reagent. This distinguishes it from earlier proposals to refine mineral oils by chemical treatment with antimony halides. Thus, the German Patent No. 427,285 and the U. S. Patent No. 1,601,753 describe the use of antimony pentachloride, which reacts chemically very aggressively with certain constituents of the oil, which may be seen from the ease with which it forms hydrogen chloride. Antimony trichloride, as used in the present process, lacks these properties, is comparatively stable and performs primarily only a physical solvent action.

The present process should also be distinguished from processes such as that disclosed in the U. S. Patent No. 1,760,585, wherein an antimony salt is deposited on absorbent, dried hydrous aluminum silicate, and oil is percolated through a bed of the resulting contact material, causing sulphur compounds to react therewith, but no selective solvent extraction, involving the formation of raffinate and extract phases, is effected.

The process according to the present invention is carried out at temperatures at which the mixture of the hydrocarbons being extracted and the antimony trichloride solvent is liquid. Antimony trichloride melts at 73° C., so that when it is employed as a single solvent, temperatures not lower than about 35° to 60° C. must usually be employed, depending upon the nature of the hydrocarbon mixture and the solvent purity; the purer the $SbCl_3$, the higher the minimum extraction temperature. In such cases, the preferred temperature is between 35° C. and 100° C., although the invention is not restricted to these values. Thus, temperatures as high as 180° C. have been found to be operative, although better results are usually obtained at the lower temperatures.

The process may be carried out in the presence of other inorganic substances, such as $SnCl_4$ or $TiCl_4$; or with selective solvents like nitrobenzene, cresol, etc.; or with diluents such as carbon disulphide, benzol, toluol, xylol and other mono- and polycyclic aromatic compounds, such as aromatic fractions obtained by extracting gasoline, kerosene and similar light distillates.

Thus, by using some of the above-mentioned substances, it is possible to operate at lower temperatures than those described above by using the antimony trichloride together with substances which yield mixtures with antimony trichloride having lower melting points. These substances may be solvents or diluents or may naturally occur in the hydrocarbon mixture to be extracted. When a diluent is used, the solubility of the components to be dissolved is enhanced and the operating temperature decreases. One may, however, use substances which alter the melting point of the $SbCl_3$, but do not change the solubility relations materially.

The following figures may be given as examples of the extent to which the melting point of $SbCl_3$ is lowered by the addition of substances of inorganic or organic nature:

Melting point, °C.
20 mol % aniline+80 mol % $SbCl_3$_____ 32
70 mol % $SbCl_3$+30 mol % $SbBr_3$_____ 54

Further, the extraction may be carried out in the presence of solvents for the more saturated constituents of the mixture being extracted, such as propane, naphtha, gasoline, particularly fractions poor in aromatics. Solvents of this type may be introduced into the extraction together with the selective solvents; it is preferable to use a countercurrent between the two solvents. One may add the oil to one of the solvents or introduce the oil into the extraction system at some point between the points of introduction of the solvents. Normally the solvents are introduced at opposite ends of said system.

The extraction will be further understood from the examples. The process may be carried out in accordance with any of the known methods for selective solvent extraction. These various methods, being known per se, need not be described herein in detail, but a few of the principal types of operations may be enumerated and reference made to patents describing them. Thus, the process can be carried out in a single stage, or in several stages, which may be arranged as discrete stages including mixing and settling devices, or gradually, i. e. by making use of packed columns or similar apparatus providing for a gradual change in the compositions of the phases, and passing the two phases countercurrently to each other through said column.

The countercurrent principle, in which the hydrocarbon mixture and selective solvent are introduced at spaced points in a countercurrent extraction zone and flowed countercurrently to one another, need not be restricted to the gradual process, it being very common to use discrete stages and to pass two phases in countercurrent to each other through the extraction system built up of at least two discrete stages. One may also use the crosscurrent principle, wherein the raffinate phase from one stage is treated with fresh selective solvent to extract therefrom an additional quantity of extract, or wherein the extract phase from one stage is further treated by chilling in several steps, and removing the phases formed in every step or wherein said extract phase from one stage is washed with fresh quantities of a solvent in each of the subsequent steps. The most saturated constituents are thereby removed. One may also use a combination of the countercurrent and crosscurrent principles.

The process, moreover, may be carried out in batches or continuously (these terms refer to the manner of introducing the hydrocarbon mixture to be extracted), intermittently or unintermittently (these terms refer to the character of the operations or manipulations applied in the extraction process). For an explanation of these terms, reference is made to Chem. Weekblad, vol. 35, No. 29, page 527 (1938).

The extraction may also be carried out in the manner described in the following U. S. Patents: 1,945,516; 2,023,109; 2,053,485; 2,081,719 and 2,081,720, a solvent containing antimony trichloride being in each case employed as the selective solvent.

Several of the above features are generally found combined in a technical process. One may, for example, at the same time operate continuously in discrete stages, countercurrently and unintermittently; or one may operate continuously, gradually, in crosscurrent and unintermittently.

The antimony trichloride may be removed from the extract and raffinate phases produced in the process by various methods, e. g. by distillation (the antimony trichloride being taken off overhead or as the distillation residue, depending upon the boiling range of the hydrocarbon mixture extracted), or by washing with a washing agent, such as dilute hydrochloric acid.

It is desirable that water be excluded from the hydrocarbons and the solvents to prevent deterioration of the antimony trichloride, which e. g. may occur during the distillation, although the invention is not limited to operation under anhydrous conditions, it being possible to operate in the presence of HCl or a similar agent which suppresses deterioration, or even to operate without such a suppressor, inasmuch as the efficacy of the solvent for extraction is not destroyed by the loss of small quantities thereof.

Antimony trichloride has toxic properties, and it is desirable to take precautions to prevent leaks in the system.

With reference to the corrosion of the apparatus it was found that aluminum, silumin and Monel metal are suitable materials of construction, aluminum being the most resistant, and may be employed for the construction of the contact and distilling units.

The results produced by the process and its utility for treating various types of oils are illustrated by the following examples:

*Example I.—Single-stage batch extractions on lubricating oils*

A dewaxed Venezuelan lubricating oil distillate (Oil No. 1) and a Mid-Continent residual lubricating oil which had previously been deasphaltized and dewaxed with propane (Oil No. 2) having the properties shown in the table were each mixed with 50% by volume of molten antimony trichloride, shaken therewith at the extraction temperature indicated, and subsequently left to stand, which resulted in the separation of the mixture into extract and raffinate layers. These layers were separated by decantation, and the antimony trichloride was separated by washing with dilute HCl. The yields and properties of the oils were as shown in Table I:

*Table I*

|  | Oil No. 1 | | | Oil No. 2 | | |
| --- | --- | --- | --- | --- | --- | --- |
|  | Original | Raffinate | Extract | Original | Raffinate | Extract |
| Yield by vol | 100% | 73% | 27% | 100% | 74% | 26% |
| Extraction temperature | 40° C. | | | 65° C. | | |
| Viscosity at 210° F. (centistokes) | 12.16 | 9.33 | | 22.0 | 15.2 | |
| Viscosity index | +63 | +96 | | +69 | +90 | |
| Density $d_4^{25}$ | 0.9088 | 0.875 | 1.011 | 0.9143 | 0.8849 | 1.0039 |
| Colour union | 8 | 3 | | 8 | 5+ | |
| Conradson carbon residue | | | | 2.6 | 0.57 | |

In both extractions more than 99% of an antimony trichloride was recovered, indicating that no chemical reaction took place.

*Example II.—Three-stage countercurrent extraction on lubricating oil*

A Colon asphalt-containing residual oil of lubricating viscosity range which had not been deasphalted or dewaxed, having the following properties: $d^{25}_4=0.944$; $V_k$ 140° F.=336; $V_k$ 210° F.=51.8; V. I.=71; $E^{50}$=83; V. G. C.=0.876; a Conradson carbon residue of above about 12.0 and a pour point of +21° C., was extracted at 75° C. in countercurrent in three stages with 60% by volume of antimony trichloride. Between 59% and 60% by volume of a raffinate having a Conradson carbon residue of 0.55 was produced, which, after dewaxing, yielded 44% by volume (based on the original residue) of a dewaxed raffinate having the following properties:

| | |
|---|---|
| Viscosity at 210° F_____centistokes__ | 12.73 |
| Viscosity index_____ | +104 |
| Colour, Union_____ | 7+ |
| Conradson carbon residue_____ | 0.52 |
| Density, $d^{25}_4$ _____ | 0.8733 |

*Example III.—Single-stage batch extraction on gasoline*

A gasoline boiling between 100° and 170° C. had the properties given in the table. It was shaken at 60° C. with 100% by vol. of molten antimony trichloride. The mixture was then allowed to stand, causing the separation of raffinate and extract layers. The layers were separated and the gasoline was separated from each layer by distillation at sub-atmospheric pressure. The properties of the gasoline in the raffinate and extract phases are shown in Table II. For comparison the initial material was also extracted with 100% by volume of liquid SO2 at a temperature of —20° C., selected so as to extract about as much of the gasoline as in the experiment with antimony trichloride. The results are also shown in the table.

*Table II*

| | Original gasoline | Extraction with SbCl3 | | Extraction with liquid SO2 | |
|---|---|---|---|---|---|
| | | Raffinate | Extract | Raffinate | Extract |
| Yield by volume_____ | 100% | 60% | 40% | 64% | 36% |
| Density, $d^{25}_4$ _____ | 0.7771 | 0.7417 | 0.8282 | 0.752 | 0.818 |
| Refractive index $n^{20}_D$ ___ | 1.4382 | 1.4151 | 1.4729 | 1.4221 | 1.4657 |
| Percent sulphonatables by vol__ | 33.5% | 6% | 72% | 14% | 64% |

The foregoing data show that antimony trichloride is much more selective than liquid sulphur dioxide.

We claim as our invention

1. A process for the manufacture of refined products from a mixture consisting essentially of non-aromatic hydrocarbons and a substance selected from the group consisting of aromatic, oxy and sulphur hydrocarbons, comprising the steps of bringing said mixture while in the liquid state into contact with liquid antimony trichloride as such in a solvent capacity, under conditions to dissolve a portion of said mixture in said antimony trichloride and to produce a liquid extract phase containing at least a portion of said substance and a liquid raffinate phase, and separating said phases.

2. A process for separating aromatic hydrocarbons from a hydrocarbon mixture containing same comprising the steps of bringing said mixture while in the liquid state into contact with a liquid solvent comprising predominantly uncombined antimony trichloride to dissolve a portion of said mixture in said antimony trichloride to produce a liquid extract containing at least a portion of said aromatic hydrocarbon and a liquid raffinate phase, and separating said phases.

3. A process for separating coloring matter from a hydrocarbon oil naturally associated therewith comprising the steps of bringing said mixture while in the liquid state into contact with a liquid solvent comprising predominantly uncombined antimony trichloride to dissolve a portion of said oil in said antimony trichloride to produce a liquid extract containing at least a portion of said coloring matter and a liquid raffinate phase, and separating the phases.

4. A process for the manufacture of refined products from a hydrocarbon mixture containing a substance selected from the group consisting of aromatic, oxy and sulphur hydrocarbons comprising the steps of bringing said mixture while in the liquid state into contact with liquid antimony trichloride as such in a solvent capacity to dissolve a portion of said mixture in said antimony trichloride and to produce a liquid extract phase containing at least a portion of said substance and a liquid raffinate phase, separating said phases, and separating the antimony trichloride from at least one of said phases by washing it with hydrochloric acid.

5. A process for the manufacture of refined products from a hydrocarbon mixture containing a substance selected from the group consisting of aromatic, oxy and sulphur hydrocarbons comprising the steps of bringing said mixture while in the liquid state into contact with liquid antimony trichloride as such in a solvent capacity to dissolve a portion of said mixture in said antimony trichloride and to produce a liquid extract containing at least a portion of said substance and a liquid raffinate phase, separating said phases, and separating the antimony trichloride from at least one of said phases by distillation.

6. The process according to claim 1, in which the hydrocarbon mixture is a petroleum distillate.

7. The process according to claim 1, in which the hydrocarbon mixture is a sulfur-bearing petroleum distillate and the sulfur compounds are extracted into the extract phase.

8. The process according to claim 1, in which the hydrocarbon mixture is a petroleum residue.

9. The process according to claim 1, in which the solvent consists substantially of antimony trichloride.

10. The process according to claim 1, in which the quantity of antimony trichloride is equal to at least 25% by volume of the hydrocarbon mixture.

11. A process for the refining of a mineral lubricating oil containing aromatic hydrocarbons and coloring matter, comprising the steps of bringing said lubricating oil while in the liquid state into contact with liquid antimony trichloride as such in a solvent capacity to produce liquid raffinate and extract phases, and separating said phases.

12. A process for the refining of a mineral lubricating oil containing coloring matter, comprising the steps of bringing said oil while in the liquid state into contact with a liquid mixture consisting essentially of antimony trichloride and a diluent comprising a normally liquid aromatic hydrocarbon, to produce liquid extract and raffinate phases, and separating said phases.

13. The process according to claim 12 wherein said diluent is xylene.

14. A process for the manufacture of refined products from a hydrocarbon mixture at least a portion of which boils above the boiling temperature of antimony trichloride said mixture containing a substance selected from the group consisting of aromatic, oxy and sulphur hydrocarbons, comprising the steps of bringing said mixture while in the liquid state into contact with liquid solvent predominantly comprising uncombined antimony trichloride, to dissolve a portion of said mixture in said antimony trichloride to produce liquid extract and raffinate phases, and separating said phases.

FRANCISCUS JOHANNES FREDERICUS van der PLAS.